UNITED STATES PATENT OFFICE.

AUGUST BUECHER, OF HEIDELBERG, GERMANY.

COMPOSITION FOR REMOVING RUST FROM IRON OR STEEL.

SPECIFICATION forming part of Letters Patent No. 524,085, dated August 7, 1894.

Application filed December 8, 1893. Serial No. 493,172. (No specimens.) Patented in Germany July 19, 1892, No. 72,366.

*To all whom it may concern:*

Be it known that I, AUGUST BUECHER, a subject of the Emperor of Germany, residing in the city of Heidelberg, in the Grand Duchy of Baden and Empire of Germany, have invented certain new and useful Improvements in Composition for Removing Rust from Steel or Iron Surfaces, (for which I have obtained Letters Patent in Germany, No. 72,366, dated July 19, 1892,) of which the following is a specification.

This invention relates to an improved composition for removing rust from the surfaces of iron and steel articles of all kinds in a quick and effective manner, and the invention consists of a rust-removing composition which combines in solid form a mixture of tartaric-acid, crystallized tin chloride or other salts such as lead nitrate, or the calcined aluminum potassium sulphate, with a "detritus" and a suitable binding substance.

My improved rust removing composition is prepared as follows: For the "detritus" calcined and pulverized stone of any kind, such as pulverized pumice-stone, ground corundum, calcined iron-containing aluminum silicate or fossil meal may be used. Either one of these stone-powders is carefully mixed by grinding with a solution of tartaric acid, which mixture is evaporated, ground, screened and bolted. This so-obtained acid stone-powder is mixed with dry crystallized tin-chloride or with an equivalent salt in dry state such as lead nitrate or calcined aluminum-potassium-sulphate. A suitable mixture of wax, ceresin, tallow, stearine or whale-oil is next slowly melted and then mixed with a suitable rosin under careful stirring and by increasing the temperature, said rosin, such as galipot, colophony, or mastic, being gradually and slowly added in small quantities. When the mass arrives at a temperature of from 125° to 130° centigrade, a small quantity of carefully washed flour of sulphur is added and the heating of the mixture continued until a thickly flowing homogeneous mass is obtained. This binding substance or wax-cement is insoluble in water and preserves the acid character of the composition. To this thickly flowing mass, the before described mixture of tartaric-acid, one of the before-mentioned salts and the detritus are gradually and slowly added under continuous stirring, upon which the so-obtained magma is kept warm, by means of steam, until it can be cast into molds which are heated before use. When it is desired to give to the composition the quality of imparting a polish to the surface to be treated, a certain polishing substance, such as colcothar, tripoli, plaster of paris, zinc-dust, ocher or iron scale is mixed with the magma before it is cast into the molds.

After casting, the magma hardens very quickly and forms a stone-like body in the shape of a brick which can be used immediately for the removal of rust from iron or steel surfaces. During the process of mixing, the tartaric-acid is to a large extent changed into metatartaric acid, which forms with the iron-containing aluminum silicate used as the detritus a body of great hardness.

The proportions, in which the different substances that are employed in making my improved rust-removing composition, preferably mixed, are as follows:—rosins 34.05 parts by weight; sulphur 10.3 parts by weight; detritus 51.7 parts by weight; wax or its equivalent 2.6 parts by weight; a salt, such as tin chloride, lead nitrate or aluminum-potassium sulphate 0.5 to 3 parts by weight, according to the effect which is to be produced.

When the composition is to be used, the block or cake of the same is dipped at one end into water and then rubbed over the surface which is to be cleaned from rust. As the tartaric-acid and the acid salt are easily soluble, they exert immediately an effect on the surface and loosen the layer of rust on the same, while the polishing substances, which are insoluble in water, exert a mechanical friction on the same, so that in a few moments the deposit of rust on the surface of the iron or steel is removed. The dark spots which still remain after the rust is removed and which are composed of magnetic oxide of iron are also removed by permitting the dissolved parts to act for a somewhat longer time on the same. None of the rust removing compositions heretofore in use shows a similar, quick and effective action when applied to rusty surfaces. After the rust has been removed, the metallic surface is first rubbed carefully with a wet, and then with a dry cloth until a perfectly clean surface is obtained.

Having thus described my invention, I claim as new and desire to secure by Letters Patent—

1. A composition of matter for removing rust from steel and iron surfaces, which consists of a stone-like mixture of tartaric-acid, a suitable salt such as tin-chloride, a finely pulverized detritus, and a suitable binding substance or wax-cement, which is composed of wax, rosin and sulphur and by which the acid character of the mass is preserved, substantially as set forth.

2. A composition of matter for removing rust from steel and iron surfaces, which consists of a hardened stone-like mixture of tartaric acid, a suitable salt such as tin-chloride, a finely-pulverized detritus, a finely-pulverized polishing substance, and a suitable binding substance or wax-cement composed of wax, rosin and sulphur, substantially as set forth.

In testimony that I claim the foregoing as my invention I have signed my name in presence of two subscribing witnesses.

AUGUST BUECHER.

Witnesses:
A. B. BEYREUTHER,
THEODOR RÜDNER.